United States Patent [19]

Kelman

[11] Patent Number: 5,336,455
[45] Date of Patent: Aug. 9, 1994

[54] METHOD OF ADDING SHREDDED STRUCTURAL REINFORCED INJECTED MOLDED PLASTIC TO A PREFORM

[75] Inventor: Josh Kelman, Dover, N.H.

[73] Assignee: Davidson Textron Inc., Dover, N.H.

[21] Appl. No.: 957,870

[22] Filed: Oct. 8, 1992

[51] Int. Cl.⁵ .............................................. B27N 1/02
[52] U.S. Cl. ..................................... 264/113; 264/121;
                264/122; 264/309; 264/517; 264/DIG. 69
[58] Field of Search ............... 264/517, 113, 121, 122,
                                        264/DIG. 69, 309

[56] References Cited

U.S. PATENT DOCUMENTS 5,041,260  8/1991  Johnson et al. ................... 264/510
5,093,059  3/1992  Nathoo et al. ................... 264/121
5,217,672  6/1993  Kelman et al. .................. 264/517
5,229,052  7/1993  Billiu ............................... 264/115

Primary Examiner—Allan R. Kuhns
Attorney, Agent, or Firm—Reising, Ethington, Barnard, Perry & Milton

[57] ABSTRACT

A process for producing a motor vehicle bumper includes the steps of depositing chopped glass fibers (19) and a curable binder (24) to a center section (38) of a preform (11) that is retained on a preform screen (14) by a vacuum draw from a suction fan (15). A ratio of shredded structural reinforced injected molded plastic (23) and glass fiber (19) is sprayed to form end sections (41) and flanges (39) of the preform (11) along with binder (24). The preform (11) is then cured on the screen (14).

14 Claims, 2 Drawing Sheets

5,336,455

METHOD OF ADDING SHREDDED STRUCTURAL REINFORCED INJECTED MOLDED PLASTIC TO A PREFORM

TECHNICAL FIELD

The field of this invention relates generally to directed fiber preforming and, more particularly, to an improved process for forming a glass fiber preform.

BACKGROUND OF THE DISCLOSURE

Glass fibers have been commonly incorporated in thermoplastic molded objects and other cured plastics for added strength and durability. The glass fiber is introduced in a mold where resinous plastic is then injected such that the glass fibers become imbedded into the final formed article. It has been found advantageous to form a self supporting preform out of glass fibers and position the preform into the mold before the resinous plastic is injected. One article which has been found to be advantageously made in this fashion is a motor vehicle bumper.

An expeditious process for forming the preform has been found to be a directed fiber spray process. The process includes blowing chopped glass fibers onto a preform screen. Immediately following the fiber placement, a binder agent is sprayed on and allowed to cure which sets the chopped fibers in place.

Conventional preforms for reinforced motor vehicle bumpers have glass fibers deposited throughout the part in a uniform manner. The preforms are made by thermoforming rolled goods such as Fabmat (tm) or by the described directed fiber spray process.

The preform is then inserted in a mold and resinous plastic is then injected into the mold to bond with the preform to form a structural reinforced injected molded article commonly referred to as a SRIM. Often the SRIM is trimmed to form scrap which is currently shipped to a land fill.

The known processes do not use layers of glass in the most efficient manner. The uniform distribution of woven roving or chopped glass fiber leads to inherent inefficiencies. Areas of lowest stress in a SRIM article have the same density and same type of costly glass fiber as the highest stress areas. Furthermore, many SRIM articles are trimmed of excess flange material. Additionally, cut outs are often cut from the SRIM article. Traditionally, all the trimmed flange material and cut out material has been considered waste product.

Recycling waste trim is becoming more economically feasible and environmentally compelling due to the increasing value of the waste material, the increasing costs of solid waste shipping and disposal, and the decreasing availability of landfills. One potential use for recycled SRIM material is in successive SRIM articles. The recycled SRIM material can be used as an expense saving substitute for expensive glass fibers. However, the need for recycling waste trim must be balanced by the need to maintain the structural integrity of structural reinforced injected molded plastic parts.

What is needed is a preform that has higher density levels of glass and glass fiber in higher stress regions of the final object and recycled scrap SRIM in areas of relatively lower stress such that the integrity of the final molded part is not jeopardized. What is also needed is a process for manufacturing such a preform. In this fashion, a SRIM article is expeditiously manufactured using recycled SRIM material without sacrifice in its structural integrity.

SUMMARY OF THE DISCLOSURE

In accordance with one aspect of the invention a fibrous preform for a motor vehicle bumper has a center section and flange and end sections made from different blends of material. The center section has a center layer of chopped glass fibers bound by cured binder. The bumper preform has two end sections that are formed from a mix of chopped glass fibers and shredded filler material bound together by cured binder. Preferably, the center section has two laterally extending top and bottom flanges that are also formed from a mix of chopped glass fibers and shredded filler material bound together by cured binder. The end sections and flanges are integrally formed with the chopped glass fibers in the center section. Cured binder secures all the glass fibers and shredded filler material together into a single integrated preform.

The shredded filler material preferably is shredded SRIM or recycled glass fibers commonly referred to a offal. However, other shredded filler material is suitable such as recycled shredded thermoplastics (RIM) parts and shredded rubber tires.

In accordance with another aspect of the invention, chopped glass fibers are sprayed onto a section of a contoured preform screen that has a vacuum draw therethrough. Shredded SRIM is sprayed onto other sections of a contoured preform screen. Reduced amounts of chopped glass fibers are also sprayed onto the areas that have the SRIM applied thereto. Curable binder is sprayed onto the chopped glass fibers and shredded SRIM and cured thereon such that the materials form an integrally formed preform that is then used in an injection molding operation to form a fiber reinforced injection molded part.

The fibers, SRIM, and binder may be blown onto the screen via a plurality of adjacent nozzles that may have relative motion with respect to the screen. The relative motion may be controlled by a software program such that the application of the chopped fibers, SRIM, and binder is automated. The program automatically reduces the amount of chopped glass fibers exiting its respective nozzle in correspondence to an increase of SRIM exiting its respective nozzle. Conversely, when the SRIM amount is reduced, the amount of chopped glass fibers is increased. The SRIM and chopped glass fibers may be blended in any desirable ratio at various sections of the preform.

In this fashion, a preform is manufactured using recycled SRIM without sacrificing the integrity of the final SRIM component for its intended purposes. Furthermore, SRIM material may recycled at the same facility in which it was originally produced saving both waste product and shipping of waste product.

BRIEF DESCRIPTION OF THE DRAWINGS

Reference now is made to the accompanying drawings in which.

DETAILED DESCRIPTION OF THE PREFERRED EMBODIMENT

Figure 1:
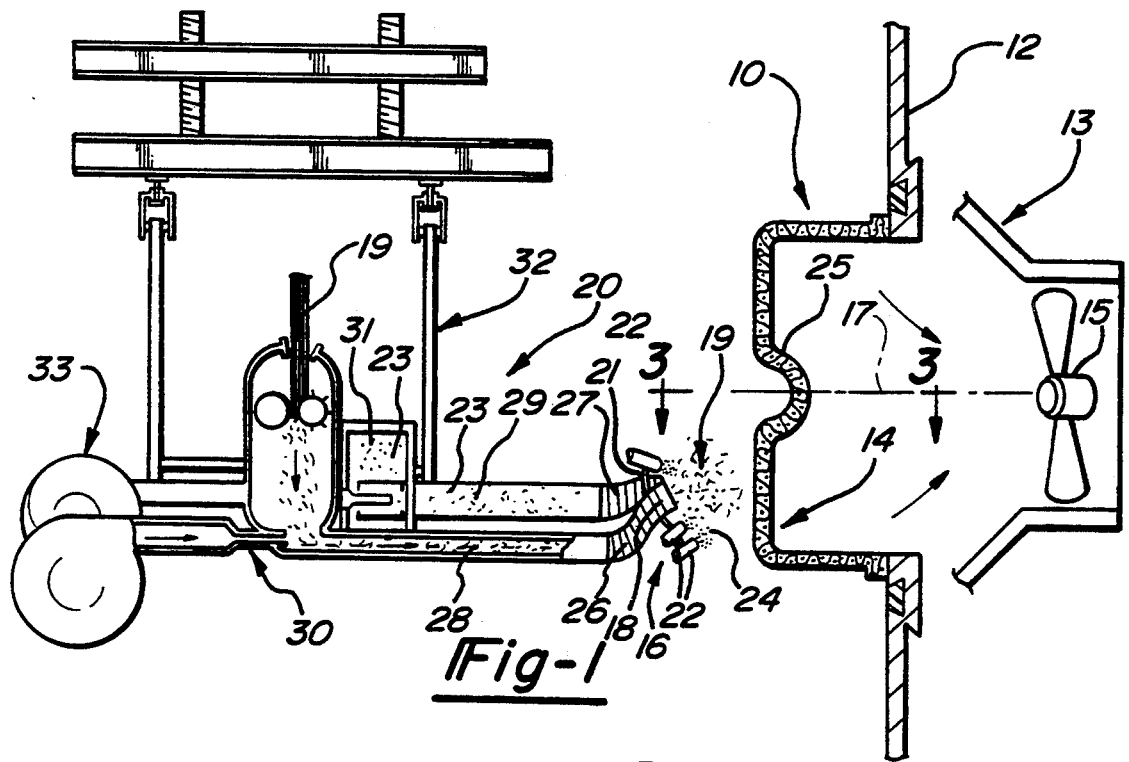
FIG. 1 is a schematic view of a preform apparatus in accordance with one embodiment of the invention.
Figure 4:
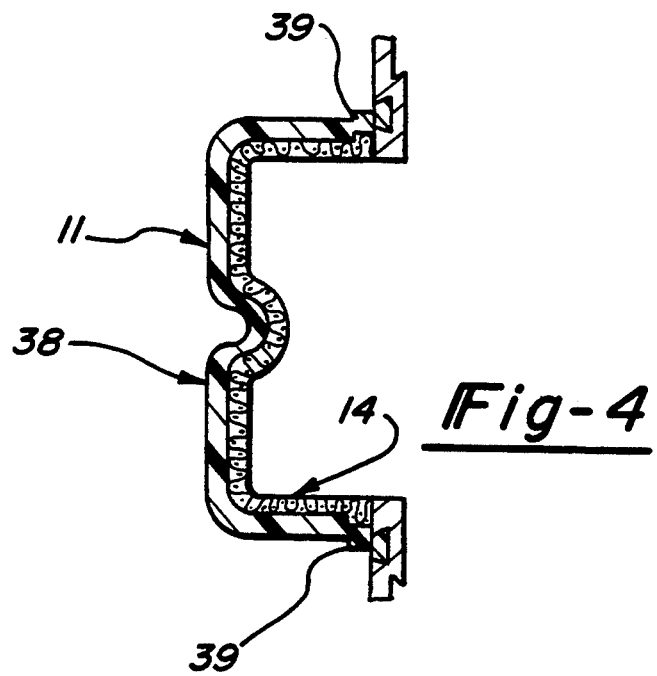
FIG. 4 is a cross-sectional view taken along the line 4—4 shown in FIG. 3.
Figure 3:
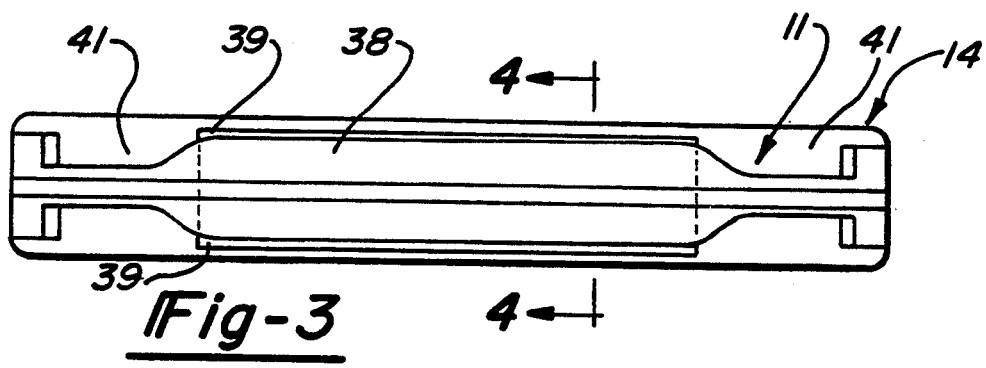
FIG. 3 is plan view of a preform screen for an automotive bumper covered by a preform formed thereon.

Reference is now made to the drawings, particularly FIG. 1, which discloses a screen assembly 10 for forming a fiber glass preform 11 illustrated in FIGS. 3 and 4. The screen assembly 10 includes a mounting table 12, a foraminous preform screen 14 and a suction fan 15. The screen 14 has a plurality of holes 25 and its contour conforms to the shape of one surface of the preform 11. The screen 14 is mounted about its periphery to the table 12 which in turn has appropriate duct work 13 for housing the suction fan 15. The suction fan when actuated draws a vacuum through the screen 14. The screen 14 may also be mounted for rotation about axis 17.

Figure 2:
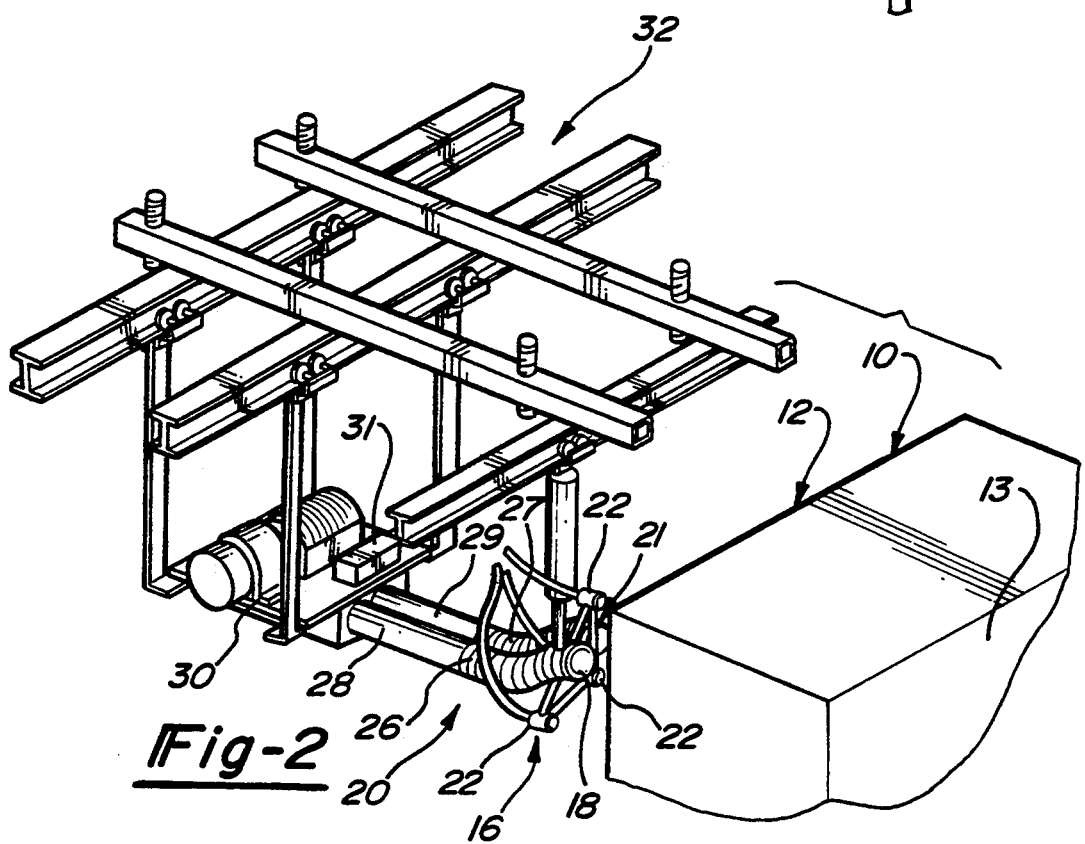
FIG. 2 is a perspective view of the apparatus shown in FIG. 1.

As illustrated in FIGS. 1 and 2, a nozzle control system, generally indicated as 20 includes a spray assembly 16 having a nozzle 18 for deposition of blown glass fibers 19, a nozzle 21 for deposition of shredded structural reinforced injection molded plastic (SRIM) 23 and a plurality nozzles 22 for the spraying of curable binder 24. Commercially available thermoset liquid or powdered binder is suitable.

The fiber nozzle 18 is the distal end of a flexible tube 26 which has its other end mounted onto a rigid delivery tube 28 in fluid communication with a chopper/blower assembly 30. The SRIM nozzle 21 is connected to a flexible tube 27 which has its other end connected to a rigid tube 29 in fluid communication with a supply chamber 31 for the SRIM 23 and blower assembly 33. The tubes 26, 27, 28, 29, chopper/blower assembly 30, supply chamber 31 and blower assembly 33 are mounted on a gantry 32 that can move the spray assembly 16 including all the nozzles left, right, up, and down relative to the screen 14.

Referring now to FIGS. 1, 3, and 4, chopped glass fibers 19 are sent through chopper/blower assembly 30 and chopped into fragments. The chopped fiber 19 is then sprayed onto the center section 38 as well as the flange section 39, and end sections 41. The glass fibers 19 used may be chopped from a commercially available roving such as one sold under the brand name PPG-5542. The chopped glass fibers may be chopped between 1" and 4" depending on the application. In addition, shredded SRIM 23 is sprayed onto the flange section 39 and center section 38. The shredded SRIM 23 has particle sizes small enough to have a powder like appearance. The powder has an aspect ratio in the range of approximately five to approximately twenty-five. The glass fibers 19 and SRIM 23 are retained on the preform screen 14 by the draw created by the fan 15.

In addition, binder 24 is also sprayed onto the entire preform screen 14 where it is cured to form the preform 11 on the screen 14. The vacuum draw by suction fan 15 retains the preform 11 on the screen 14 until the preform 11 is cured and removed.

The nozzles 18 and 21 may be angled such that they spray on the same area of the preform screen 14 simultaneously. Furthermore, binder nozzles 21 may be positioned and angled to similarly spray binder on the same area of the preform screen simultaneously with the other nozzles 18 and 21.

Figure 5:
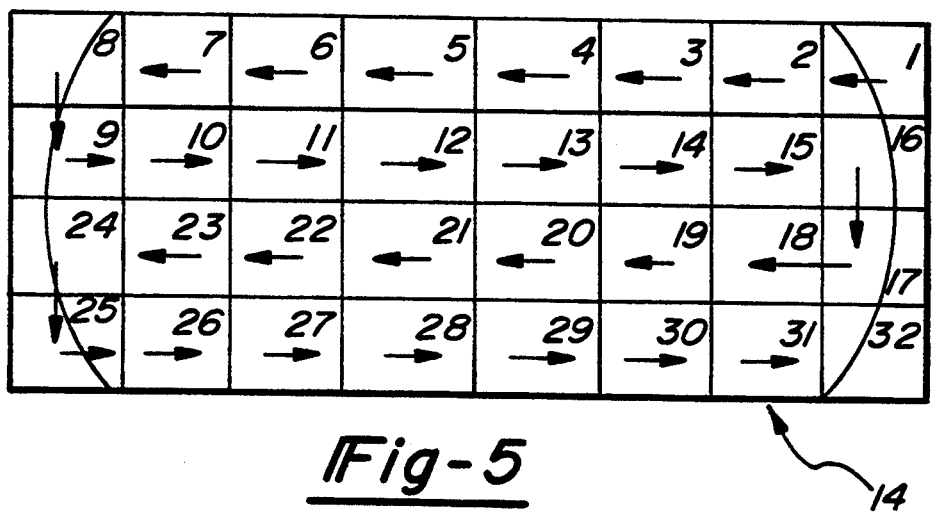
FIG. 5 is a schematic view of the screen divided up into matrix squares for use with a control system that control motion of the nozzles for the fiber, SRIM, and binder used therewith.

The gantry 32 may be programmed to work automatically by control software for adding the chopped glass fiber, shredded SRIM and binder. The automatic control system may divide the screen into a series of matrix squares 1-32 as shown in FIG. 5. In areas of the vehicle bumper where high stress is foreseen, such as center area 38, only glass fiber 19 and binder 24 is applied thereto. The blower assembly 33 connected to supply chamber 31 is shut off to cut the supply of shredded SRIM 23 and prevent the SRIM from being applied to high stress areas of the eventual manufactured article.

In area of the vehicle bumper where lower stress is encountered, such as the end areas 41 and flanges 39, the blower assembly 33 is turned on and desired amounts of shredded SRIM are applied thereto along with glass fibers 19. To maintain approximately the same weight distribution of the preform 11 in all areas, the amount of glass fibers applied to the flange areas 39 and end section 41 is reduced. It is foreseen that shredded SRIM can be added to the perimeter areas such as the end sections 41 and flanges 39 in amounts of 5% to 20% of the gross weight of the preform in those areas. The percentages are determined by the structure of the manufactured article and the differences in the stress exerted on the various areas of the article.

Each matrix square of the screen may have a different ratio of shredded SRIM and glass fiber as delivered by the respective nozzles 19 and 21. Automated hardware controlled by appropriate software controls the movement of the gantry and thus the movement of the respective nozzles over the respective matrix squares 1-32.

The software also can control the rate of chopped fiber 19 and SRIM 23 delivery by controlling the speed of the chopper/blower 30 and blower 33 and can control the amount of binder per square by controlling the binder nozzles' opening and fluid pressure. As shown in FIG. 5, the nozzle assembly 16 may move to cover the matrix squares 1-32 of screen 14. The nozzle assembly 16 may move from right to left to cover matrix squares 1-8, move downwardly from square 8 to square 9, move from left to right from square 9 to square 16, and move downwardly again from square 16 to square 17. This reciprocating pattern is then repeated until the entire screen 14 is covered.

Glass application rate and glass blower rate are also simultaneously controlled as well as other machine parameters, main blower pressure, screen rotation, and binder application rate. By controlling the rates of glass application and shredded SRIM, different ratios of fiber and shredded SRIM may be applied in each matrix square. The ability to control the ratio in each matrix square provides the flexibility and option to use this process in making preforms for a wide variety of structural reinforced injection molded components.

In this fashion, a improved process for creating an improved preform is achieved. The preform includes recycled shredded SRIM with different areas of the preform having different relative amounts of the shredded SRIM. The relative amounts of the recycled shredded SRIM corresponds to different stress levels exerted on different areas of the preform.

It should be understood that the motor vehicle bumper is illustrative on one structural reinforce injected molded component and that both the method and product formed by the method of the present invention are equally suitable for use with other structural reinforced injected molded components and that the illustrated components are not intended to limit the invention.

Other variations and modifications are possible without departing from the scope and spirit of the present invention as defined by the appended claims.

The embodiments in which an exclusive property or privilege is claimed are defined as follows:

1. A process of forming a fibrous preform for a motor vehicle bumper, said process comprising the steps of;

directing chopped glass fibers and binder onto a center section of a screen that has a contour corresponding to a surface of said motor vehicle bumper;

directing shredded structural reinforced injection molded plastic having glass fibers embedded therein and binder onto a peripheral portion of said screen; and curing said binder to form a motor vehicle bumper preform having a chopped glass fiber center section and having ends and flanges made from shredded structural reinforced injection molded plastic.

2. A process as defined in claim 1 further comprising;

said chopped glass fibers and said shredded structural reinforced injection molded plastic being blended in a plurality of ratios throughout said preform with areas subject to greater stress having a greater ratio of chopped glass fibers and areas subject to less stress having a greater ratio of shredded structural reinforced injection molded plastic.

3. A process of forming a fibrous preform for an article that has different sections thereof subject to different stress levels, said process comprising the steps of;

directing chopped glass fibers and binder onto a section of a screen that has a contour corresponding to the surface of said preform, said chopped glass fibers and binder being directed to said section that corresponds to a section of said article that undergoes higher levels of stress;

directing shredded structural reinforced injection molded plastic having glass fibers embedded therein and binder onto another section of the screen with its contour corresponding to the surface of said preform, said another section corresponding to a section of said article that undergoes less levels of stress; and curing said binder to form a preform that has a chopped glass fiber section and another section made from shredded structural reinforced injection molded plastic.

4. A process as defined in claim 3 further comprising;

said chopped glass fibers and said shredded structural reinforced injection molded plastic being blended in a plurality of ratios throughout said preform with areas subject to greater stress having a greater ratio of chopped glass fibers and areas subject to less stress having a greater ratio of structural reinforced injection molded plastic.

5. A process as defined in claim 4 wherein said chopped fibers, said shredded structural reinforced injection molded plastic and said binder are deposited from a respective first, second and third nozzles in relative motion with respect to said screen by an automatic control system which controls the ratio of chopped glass fiber and shredded structural reinforced injection molded plastic emitted from the respective first and second nozzles and the motion of the nozzles relative to the screen.

6. A process of forming a fibrous preform for a motor vehicle bumper, said process comprising the steps of;

directing chopped glass fibers and binder onto a center section of a screen that has a contour corresponding to a surface of said motor vehicle bumper;

directing a shredded filler material differing from said chopped glass fibers onto a peripheral portion of said screen with said binder; and curing said binder to form a motor vehicle bumper preform having a chopped glass fiber center section and having ends and flanges made from shredded filler material.

7. A process as defined in claim 6 further comprising;

said chopped glass fibers and said shredded filler material being blended in a plurality of ratios throughout said preform with areas subject to greater stress having a greater ratio of chopped glass fibers and areas subject to less stress having a greater ratio of second shredded filler material.

8. A process as defined in claim 6 further comprising;

said shredded filler material being a thermoplastic.

9. A process as defined in claim 6 further comprising;

said shredded filler material being recycled shredded glass fiber.

10. A process of forming a fibrous preform for an article that has different sections thereof subject to different stress levels, said process comprising the steps of;

directing chopped glass fibers and binder onto a section of a screen that has a contour corresponding to the surface of said preform, said chopped glass fibers and binder being directed to said section that corresponds to a section of said article that undergoes higher levels of stress;

directing a shredded recycled filler material and binder onto another section of the screen with its contour corresponding to the surface of said preform, said another section corresponding to a section of said article that undergoes less levels of stress; and curing said binder to form a preform that has a chopped glass fiber section and another section made from shredded recycled filler material.

11. A process as defined in claim 10 further comprising;

said chopped glass fibers and said shredded recycled filler material being blended in a plurality of ratios throughout said preform with areas subject to greater stress having a greater ratio of chopped glass fibers and areas subject to less stress having a greater ratio of said filler material.

12. A process as defined in claim 11 wherein said chopped fibers, said shredded filler material and said binder are deposited from a respective first, second and third nozzles in relative motion with respect to said screen by an automatic control system which controls the ratio of chopped glass fiber and shredded filler material emitted from the respective first and second nozzles and the motion of the nozzles relative to the screen.

13. A process as defined in claim 12 further comprising;

said shredded filler material being a thermoplastic material.

14. A process for forming a preform comprising the steps of:

providing a foraminous screen with a matrix of a plurality of sections;

drawing a vacuum through the foraminous screen;

providing a gantry having a first spray nozzle and a second spray nozzle;

moving the gantry along two axes with respect to the screen such that the first spray nozzle and the second spray nozzle can be aligned with any section of the matrix;

spraying chopped glass fibers from the first spray nozzle onto one section of the matrix;

spraying shredded structural reinforced injection molded plastic from the second spray nozzle onto another section of the matrix;

applying curable binder onto the sprayed chopped glass fibers and the sprayed shredded structural reinforced injection molded plastic to form a preform having a chopped glass fiber section and a shredded structural reinforced section; and controlling the relative rates of chopped fiber deposition and shredded structural reinforced injection molded plastic deposition in accordance with the section of the matrix onto which the respective chopped glass fibers and the shredded structural reinforced injection molded plastic are deposited.

* * * * *